United States Patent [19]

Büschges et al.

[11] Patent Number: 5,882,728
[45] Date of Patent: Mar. 16, 1999

[54] MULTILAYER, FLUORINE-CONTAINING POLYMERIC MATERIAL

[75] Inventors: Ulrich Büschges, Wachenheim; Boris Zemva, Ljubljana; Lutar Karel, Menges, all of Germany

[73] Assignee: BASF Aktiengesellschaft, Ludwigshafen, Germany

[21] Appl. No.: 894,248

[22] PCT Filed: Feb. 3, 1996

[86] PCT No.: PCT/EP96/00455

§ 371 Date: Aug. 14, 1997

§ 102(e) Date: Aug. 14, 1997

[87] PCT Pub. No.: WO96/25454

PCT Pub. Date: Aug. 22, 1996

[30] Foreign Application Priority Data

Feb. 16, 1995 [DE] Germany .................. 195 05 188.2

[51] Int. Cl.⁶ .................................................. B05D 7/22
[52] U.S. Cl. .................. 427/237; 427/248.1; 427/255.4; 428/409; 428/421; 428/422; 525/326.1; 525/326.4
[58] Field of Search .................... 428/409, 421, 428/422; 525/326.1, 326.4; 427/237, 248.1, 255.4

[56] References Cited

U.S. PATENT DOCUMENTS

| | | | |
|---|---|---|---|
| 2,811,468 | 10/1957 | Joffre | 117/95 |
| 3,647,613 | 3/1972 | Scotland | 161/165 |
| 3,862,284 | 1/1975 | Dixon et al. | 264/83 |
| 4,020,223 | 4/1977 | Dixon et al. | 428/224 |
| 4,081,574 | 3/1978 | Hawkins et al. | 427/237 |
| 4,404,256 | 9/1983 | Anand et al. | 426/409 |
| 4,830,810 | 5/1989 | Ufer et al. | 264/40.1 |
| 4,869,859 | 9/1989 | Eschwey et al. | 264/83 |
| 5,292,466 | 3/1994 | van Bonn et al. | 264/83 |

FOREIGN PATENT DOCUMENTS

| | | | |
|---|---|---|---|
| 611 791 | 8/1994 | European Pat. Off. | C08J 7/12 |
| 1 905 094 | 1/1970 | Germany . | |
| 26 44 508 | 4/1978 | Germany | B05D 5/00 |
| 35 23 137 | 4/1986 | Germany | B29C 49/00 |
| 36 40 975 | 9/1988 | Germany | C08J 7/12 |
| 42 12 969 | 10/1993 | Germany | C08J 7/12 |
| 43 41 671 | 6/1994 | Germany | B32B 1/02 |
| 280 772 | 7/1990 | Sweden | C08J 7/12 |
| 1 588 463 | 4/1981 | United Kingdom | C08F 110/02 |

OTHER PUBLICATIONS

Derwent–Abst. JP 6 2111 739 (May 22, 1987).
Derwent Abst. SU 18 16 773 (May 23, 1989).
Chem. Abst. JP 6 3218 064 (Sep. 12, 1988).

*Primary Examiner*—Robert Dawson
*Assistant Examiner*—Caixia Lu-Rutt
*Attorney, Agent, or Firm*—Keil & Weinkauf

[57] ABSTRACT

A polymeric material of at least two layers and having at least one fluorine-containing layer and at least one non-fluorine-containing layer, the fluorine-containing layer is from 0.01 to 100 μm thick, contains from 0.1 to 0.76 g of fluorine/g of the fluorine-containing layer and has from 361 μg to 50 mg of fluorine/cm². The polymeric material is used for the production of storage containers, in particular for fuel.

10 Claims, No Drawings

MULTILAYER, FLUORINE-CONTAINING POLYMERIC MATERIAL

The present invention relates to a polymeric material consisting of at least two layers and comprising at least one fluorine-containing layer, and at least one non-fluorine-containing layer, wherein the fluorine-containing layer is from 0.01 to 100 μm thick, contains from 0.1 to 0.76 g of fluorine/g of the fluorine-containing layer and has from 561 μg to 50 mg of fluorine/cm$^2$.

The fluorination of different articles for producing a fluorine-containing layer on these articles is known. The fluorine-containing layer of these moldings and films has in many cases a certain barrier action against the penetration of volatile substances.

For example, in order to prevent the permeation of fuels through plastic tank walls, the plastic fuel tanks are fluorinated.

DE-C 36 40 975, DE-C 26 44 508, DE-C 35 23 137, DE-C 42 12 969, DE-A 36 40 975, DE-B 19 05 094, DE-C 24 01 948 and U.S. Pat. No. 2,811,468 describe the fluorination of polymeric moldings, films and other articles.

However, the processes used for this purpose and the barrier action of the fluorinated layers are unsatisfactory.

DE-B 19 05 094 describes storage containers for fuel whose container wall has from 0.01 to 30 μg of fluorine/cm$^2$ of wall.

U.S. Pat. No. 2,811,468 cited above describes a fluorinated polyethylene film whose fluorine content is so high that it is virtually impermeable to atmospheric gases, but whose fluorine content does not exceed 3.5% by weight.

However, the barrier action of the fluorinated articles, described in the literature cited at the outset, against organic chemical compounds is unsatisfactory.

On the basis of the present state of knowledge, it may be assumed that the chemical structure of the surface layer obtained by fluorination plays a decisive role in determining the permeability of this layer or in other words its barrier action against relatively small molecules. On the other hand, it is not possible to predict or even to plan the methods by means of which precisely the adequate or optimum quality of the barrier layer can be obtained.

It is an object of the present invention to remedy the deficiencies described; in particular, it is intended to reduce the permeability of the fluorine-containing polymeric materials to relatively small molecules.

We have found that this object is achieved by the polymeric materials defined at the outset. We have also found a process for the preparation of the novel polymeric materials, the use of the novel polymeric materials as permeation barrier, the use of the novel materials for the production of films, fibers and moldings and the fibers, films and moldings comprising the novel polymeric materials.

The novel multilayer fluorine-containing polymeric materials are obtained by the novel process, by the fluorination of polymers.

Polymers suitable for this purpose are in general those which are not completely degraded in the reaction with the fluorinating agent under the novel conditions. For the purposes of the present invention, not completely degraded means that the polymer is not destroyed by the fluorination process, for example by decomposition into useless fragments.

Suitable polymers generally have carbon-hydrogen bonds, some or all of which can be replaced by carbon-fluorine bonds during the fluorination process.

Examples of suitable polymers of this type are all plastics which can be processed by thermoplastic methods, for example polyesters, polyethers, polyetherketones, polyamides, polystyrenes and polyolefins.

Polyolefins, for example homopolymers of propylene, copolymers of propylene with $C_2$–$C_4$-α-olefins, homopolymers of ethylene, copolymers of ethylene with $C_3$–$C_8$-α-olefins or α,β-unsaturated carboxylic acids or derivatives thereof, are particularly suitable. Ethylene polymers having a density of from 0.890 to 0.968 g/cm$^3$, in particular HDPE having a density of from 0.940 to 0.962 g/cm$^3$, are preferably used.

Such polyolefins are prepared by the known polymerization methods. These are, for example, the low-pressure polymerization methods using Ziegler, Phillips or metallocene catalyst systems, and high-pressure polymerization, which is generally initiated by free radicals.

For the purposes of the present invention, suitable fluorinating agents are those pure substances or mixtures which do not completely degrade the starting polymer in the reaction under the novel fluorinating conditions.

Suitable pure substances are elemental fluorine, halogen fluorides, eg. chlorine fluoride, chlorine trifluoride or bromine fluoride, nitrogen fluorides, eg. nitrogen trifluoride, nitrogen oxyfluoride (NOF), nitrogen dioxyfluoride, arsenic trifluoride, arsenic pentafluoride, antimony pentafluoride, sulfur tetrafluoride, silicon tetrafluoride, boron trifluoride, boron trifluoride etherate, hydrogen tetrafluoroborate, noble gas fluorides, eg. $XeF_2$ or $XeF_4$, and their adducts with HF.

However, mixtures of fluorine gas or one of the other fluorinating agents with one or more diluent gas or gases which is or are inert to fluorine gas or to the fluorinating agents under the fluorinating conditions are also used. In general, the light noble gases helium, neon, argon and nitrogen are used as diluent gases. Nitrogen is preferably used as an inert diluent gas.

Preferred gas mixtures comprising fluorine/inert gas or gases contain the fluorine gas in an amount of from 0.1 to 99.5, preferably from 1 to 99, % by volume, based on the gas mixture. The diluent gases then account for the remaining amount to 100% by volume. The ratio is not critical.

The fluorination of the polymer serving as starting material is carried out in a plurality of stages. This process can be carried out both for polymers which have cooled and for polymers whose temperature is in general close to the crystallite melting point or softening point.

No particular requirements over and above the usual requirements of fluorination technology are set with regard to the reaction spaces for the preparation of the novel polymeric material, except that they should be substantially resistant to the fluorinating agents and should withstand pressure loads in the abovementioned working range. Here, substantially resistant means that they are not destroyed by the fluorinating agents during the novel use.

In the first stage of the fluorination process, the ambient pressure P1 of the polymer to be fluorinated, in the absence of the fluorinating agent, in the reaction chamber, is reduced to 0.001–0.5, preferably 0.01–0.1, kPa, in general with the aid of a vacuum pump.

This is generally effected at reaction temperatures of from 20° to 200° C., preferably from 20° to 80° C. The pressure P1 is generally maintained for from 1 to 60 minutes.

Thereafter, in a second stage, the pressure P2 is increased in the reaction chamber with the aid of a fluorinating agent, preferably elemental fluorine or a fluorine-containing gas, to 0.1–300, preferably 1–300, kPa.

Here, the temperature is in general from 20° to 200° C., preferably from 20° to 80° C., and the pressure P2 is generally maintained for from 10 to 300 minutes. The fluorine concentration of the fluorine-containing gas is from 0.1 to 99, preferably from 1 to 99, % by volume.

In general, the pressure in the fluorination chamber is then reduced to 0.01–1 kPa.

Thereafter, in a third stage, the pressure P3 in the reaction chamber is established with the aid of a fluorinating agent, preferably elemental fluorine or a fluorine-containing gas, at from 0.1 to 300, preferably from 10 to 300, kPa. Here, the temperature is in general from 20° to 200° C., preferably from 20° to 80° C., and the pressure condition P3 is generally maintained for from 5 to 300 minutes.

The fluorine concentration of the fluorine-containing gas is from 0.1 to 99, preferably from 1 to 99, % by volume.

In general, the pressure in the fluorination chamber is then reduced to 0.01–1 kPa.

Thereafter, in a fourth stage, the pressure P4 in the reaction chamber is established with the aid of a fluorinating agent, preferably elemental fluorine or a fluorine-containing gas, at from 0.1 to 1000, preferably from 10 to 800, kPa. Here, the temperature is in general from 20° to 200° C., preferably from 20° to 80° C., and the pressure condition P4 is generally maintained for from 0.5 to 200, preferably from 0.5 to 100, in particular from 0.5 to 50, hours.

The fluorine concentration of the fluorine-containing gas is from 0.1 to 100, preferably from 1 to 100, % by volume.

The fluorinated polymeric material is then removed from the reaction chamber.

The fluorinated polymeric material contains in general a relatively thin fluorine-containing layer and a thicker layer of the base polymer. These two layers are as a rule not separable from one another by the conventional, physical separation methods, for example extraction with solvents, peeling off, etc.

The fluorine content of the fluorine-containing layer is from 361 $\mu$g to 50 mg of fluorine/cm$^2$, preferably from 448 $\mu$g to 40 mg of fluorine/cm$^2$; it, was determined by digesting the polymer by the Wickbold method and then determining the fluoride by means of an ion-sensitive electrode (F. Ehrenberger, Quantitative organische Elementaranalyse, VCH-Verlag (1991), page 649 et seq. and page 424 et seq. (digestion)).

The thickness of the fluorinated layer was determined by the transmission electron microscopy method and is from 0.01 to 100 $\mu$m, preferably from 0.1 to 100 $\mu$m.

The amount of chemically bonded fluorine is from 0.1 to 0.76, preferably from 0.4 to 0.76, g of fluorine/g of the fluorine-containing layer, determined by ESCA spectroscopy and based on the fluorine-containing layer of the multilayer polymeric material.

The novel polymeric material is distinguished in particular by its barrier action against small molecules, which was determined by the permeation method based on ECE 34, Appendix 5, on hollow bodies (volume from 0.3 to 30 l).

The container to be tested is half filled with fuel, tightly closed, initially stored for four weeks at an ambient temperature of 40° C., emptied, half filled again and stored for a further eight weeks. The permeation is determined by the weight loss of the filled containers.

The small molecules generally have a molecular weight of from 16 to 1000, preferably from 25 to 500, in particular from 30 to 250, g/mol.

The chemical nature of these molecules is in general not critical, but the barrier action of the novel polymeric material is displayed in a particularly clear manner toward organic molecules, for example aliphatic and aromatic hydrocarbons, alcohols, ethers, ketones and the like.

The novel polymeric material can be particularly advantageously used as a barrier layer for hydrocarbon-containing mixtures having a hydrocarbon content of from 5 to 100, preferably from 10 to 100, % by weight.

The proportion which makes up the amount to 100% by weight is in general formed by other organic substances, preferably by alcohols and ethers.

Suitable hydrocarbons are aliphatics, such as methane, ethane, propane, butane, pentane, hexane, heptane, octane and their isomers, preferably the refinery fraction for the preparation of fuels.

Furthermore, examples of aromatics are benzene, toluene, ethylbenzene and xylenes, preferably the aromatic fraction which is present in the preparation of fuels.

Suitable alcohols are $C_1$–$C_5$-alkanols, such as methanol, ethanol, 1-propanol, 2-propanol, 1-butanol, 2-butanol, tert-butanol, n-amyl alcohol and isoamyl alcohol, preferably $C_1$–$C_4$-alcohols, in particular methanol and ethanol.

Suitable ethers are symmetrical and asymmetrical $C_1$–$C_5$-dialkyl ethers. Such ethers are, for example, dimethyl ether, diethyl ether, tert-butyl methyl ether, tert-butyl ethyl ether and tert-amyl methyl ether.

The novel polymeric material very particularly advantageously acts as a barrier layer for the conventional fuel mixtures for operating motor vehicles, such as gasoline fuel and diesel fuel, as well as for fuel oil.

It should be pointed out in particular that the permeation of alcohol-containing fuels is greatly reduced.

The novel polymeric material can be used for the production of films, fibers and moldings of all types.

The novel polymeric material can preferably be used for the production of storage containers, for example bags, canisters, tanks and containers. In particular the novel material can be used for the production of plastic fuel tanks for motor vehicles of all types, for example cars, motorcycles, buses and trucks, and also advantageously for fuel oil tanks and industrial bulk containers.

The fibers, films and moldings of the novel polymeric material can be produced by the methods known to a person skilled in the art, for example extrusion.

Various methods can be used for this purpose. The polymers to be fluorinated may be present in practise as pure substances in the preshaped state, for example as film or hollow body or the like and can then be fluorinated (off-line method). On the other hand, the polymers to be fluorinated may be fluorinated during the shaping process (in-line method).

It is also possible to use preshaped, multilayer polymer materials for the fluorination, to fluorinate multilayer films or moldings during the shaping process or to use the novel polymeric materials as part of a laminate.

EXAMPLES

In a reaction chamber capable of being evacuated, bottles of HDPE (Lupolen® 4261 A) having a volume of 300 ml were fluorinated under the experimental conditions stated in Tables 1 and 2, the first stage being carried out in the absence of the fluorinating agent.

The bottles were then tested in the permeation test similarly to ECE 34, Appendix 5, to determine their barrier action against the test fuel with the name Haltermann CEC-RF-08-A-85 (M0) and the FAM test liquid DIN 51604-B. The test results are listed in Tables 3 and 4. Comparative measurements with untreated bottles of Lupolen® 4261 A as a reference were carried out.

TABLE 1

Process conditions in the fluorination

| Series | 1 | 2 | 3 | 4 | 5 |
|---|---|---|---|---|---|
| $P_1$ [kPa] | 0.01 | 0.01 | 0.01 | 0.01 | 0.01 |
| T [°C.] | 25 | 25 | 25 | 25 | 50 |
| t [min] | 15 | 15 | 15 | 15 | 5 |
| $P_2$ [kPa] | 160 | 160 | 160 | 160 | 160 |
| $F_2/N_2$ [% by vol.] | 10/90 | 10/90 | 10/90 | 20/80 | 10/90 |
| T [°C.] | 25 | 25 | 25 | 25 | 25 |
| t [min] | 90 | 90 | 90 | 90 | 90 |
| $P_3$ [kPa] | 113 | 113 | 113 | 113 | 113 |
| $F_2/N_2$ [% by vol.] | 50/50 | 50/50 | 50/50 | 50/50 | 30/70 |
| T [°C.] | 25 | 25 | 35 | 25 | 25 |
| t [min] | 90 | 90 | 90 | 90 | 90 |
| $P_4$ [kPa] | 160 | 160 | 160 | 160 | 590 |
| $F_2/N_2$ [% by vol.] | 100/0 | 50/50 | 50/50 | 100/0 | 50/50 |
| T [°C.] | 25 | 45 | 45 | 25 | 25 |
| t [h] | 41 | 20 | 2 | 4 | 5 |

TABLE 2

Process conditions in the fluorination

| Series | 6 | 7 | 8 |
|---|---|---|---|
| $P_1$ [kPa] | 0.01 | 0.01 | 0.01 |
| T [°C.] | 25 | 25 | 25 |
| t [min] | 15 | 15 | 15 |
| $P_2$ [kPa] | 160 | 160 | 160 |
| $F_2/N_2$ [% by vol.] | 5/95 | 5/95 | 10/90 |
| T [°C.] | 30 | 25 | 25 |
| t [min] | 100 | 95 | 95 |
| $P_3$ [kPa] | 113 | 113 | 113 |
| $F_2/N_2$ [% by vol.] | 50/50 | 50/50 | 50/50 |
| T [°C.] | 25 | 25 | 25 |
| t [min] | 90 | 90 | 90 |
| $P_4$ [kPa] | 160 | 160 | 160 |
| F compound | $XeF_2$/HF | $XeF_2$/HF | $XeF_2$/HF |
| Amount | 2 g/10 ml | 2.5 g/10 ml | 2.5 g/10 ml |
| T [°C.] | 25 | 25 | 25 |
| t [h] | 40 | 40 | 40 |

TABLE 3

Permeation properties of the barrier layer

| Series | 1 | 2 | 3 | 4 | 5 |
|---|---|---|---|---|---|
| Layer thickness Fluorine polymer [μm] | 8 | 6 | 2 | 4 | 10 |
| F content [μgF/cm$^2$] | 1016 | 710 | 361 | 448 | 1006 |
| Reduction of the permeation in comparison with the untreated bottle [%] | | | | | |
| M0 | 99.8 | 99.8 | 99.8 | 99.8 | 99.9 |
| FAM-B | 98.5 | 97.1 | 98.1 | 98.5 | 98.1 |

TABLE 4

Permeation properties of the barrier layer

| Series | 6 | 7 | 8 |
|---|---|---|---|
| Layer thickness Fluorine polymer [μm] | 2 | 2 | 3 |
| F content [μgF/cm$^2$] | 300 | 286 | 337 |
| Reduction of the permeation in comparison with the untreated bottle [%] | | | |
| M0 | 99.8 | 99.9 | 99.9 |
| FAM-B | 93.6 | 94.6 | 94.9 |

We claim:

1. A polymeric material obtained by fluorination, comprising at least two layers and comprising at least one fluorine-containing layer and at least one non-fluorine-containing layer, wherein the fluorine-containing layer is from 0.01 to 100 μm thick, contains from 0.1 to 0.76 g of fluorine/g of the fluorine-containing layer and has from 361 μg to 50 mg of fluorine/cm$^2$.

2. A polymeric material comprising at least two layers, as defined in claim 1, wherein the non-fluorine-containing layer contains a polyolefin.

3. A polymeric material comprising at least two layers, as defined in claim 1 or 2, wherein the non-fluorine-containing layer contains an ethylene polymer.

4. A process for the preparation of a multilayer polymeric material containing at least one fluorine-containing layer, as defined in claim 1, by fluorinating a polymer, wherein the ambient pressure of the polymer is first reduced to a pressure P1 of from 0.001 to 0.5 kPa, and thereafter fluorination is effected in a second stage with a fluorine-containing gas at a pressure P2 of from 1 to 300 kPa, then in a third stage with a fluorine-containing gas at a pressure P3 of form 10 to 300 kPa and finally in a fourth stage at a pressure P4 of from 10 to 800 kPa, P1 being smaller than P2, P3 and P4 and the temperature during the fluorination being from 20° to 80° C.

5. A process as defined in claim 4, wherein the temperature during the fluorination is from 25° to 45° C.

6. A film, fiber or molding formed for the polymeric material as defined in claim 1.

7. A permeation barrier for small molecules, which barrier is formed from the polymeric material defined in claim 1.

8. A method of preventing the permeation of mixtures having a hydrocarbon content of from 5 to 100% by weight which comprises placing the mixtures within a vessel formed from the polymeric material of claim 1.

9. A fuel storage container formed from the polymeric material of claim 1.

10. The polymeric material of claim 1, wherein the fluorine-containing layer has from 448 μg to 40 mg of fluorine/cm$^2$.

* * * * *

UNITED STATES PATENT AND TRADEMARK OFFICE
CERTIFICATE OF CORRECTION

PATENT NO.: 5,882,728

DATED: Mach 16, 1999

INVENTOR(S): BUESCHGES et al.

It is certified that error appears in the above-identified patent and that said Letters Patent is hereby corrected as shown below:

Col. 6, claim 4, line 40, "form" should be --from--.

Col. 6, claim 6, line 46, "formed for" should be --formed from--.

Signed and Sealed this

Twenty-seventh Day of July, 1999

*Attest:*

Q. TODD DICKINSON

*Attesting Officer*    *Acting Commissioner of Patents and Trademarks*